US008341134B2

(12) United States Patent
Bourbonnais et al.

(10) Patent No.: US 8,341,134 B2
(45) Date of Patent: Dec. 25, 2012

(54) ASYNCHRONOUS DELETION OF A RANGE OF MESSAGES PROCESSED BY A PARALLEL DATABASE REPLICATION APPLY PROCESS

(75) Inventors: Serge Bourbonnais, Palo Alto, CA (US); Somil D. Kulkarni, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 12/964,807

(22) Filed: Dec. 10, 2010

(65) Prior Publication Data

US 2012/0150829 A1    Jun. 14, 2012

(51) Int. Cl.
G06F 7/00       (2006.01)
G06F 17/30      (2006.01)

(52) U.S. Cl. .......................................... 707/703; 714/15
(58) Field of Classification Search .................... None
See application file for complete search history.

(56) References Cited

U.S. PATENT DOCUMENTS

| 4,620,276 | A |   | 10/1986 | Daniell et al. |
| 4,631,673 | A |   | 12/1986 | Haas et al. |
| 4,646,229 | A |   | 2/1987  | Boyle |
| 4,648,036 | A |   | 3/1987  | Gallant |
| 4,853,843 | A |   | 8/1989  | Ecklund |
| 5,758,333 | A |   | 5/1998  | Bauer et al. |
| 5,787,247 | A |   | 7/1998  | Norin et al. |
| 5,791,769 | A | * | 8/1998  | Yang .............................. 362/294 |
| 5,806,075 | A |   | 9/1998  | Jain et al. |
| 5,832,514 | A |   | 11/1998 | Norin et al. |
| 5,884,324 | A |   | 3/1999  | Cheng et al. |
| 5,890,154 | A |   | 3/1999  | Hsiao et al. |
| 5,894,567 | A | * | 4/1999  | Dodd et al. .................... 713/400 |
| 5,916,307 | A | * | 6/1999  | Piskiel et al. .................. 719/314 |
| 5,920,860 | A |   | 7/1999  | Maheshwari et al. |
| 5,991,768 | A |   | 11/1999 | Sun et al. |

(Continued)

FOREIGN PATENT DOCUMENTS

EP     0674260 B1 *  9/1995

OTHER PUBLICATIONS

Replication Components in IBM Replication Server, Kumar-Chatterjee, Enterprise Articles IBM, Aug. 2010.*
USPTO U.S. Appl. No. 10/788,556, 2 pages.
USPTO U.S. Appl. No. 10/788,651, 2 pages.
USPTO U.S. Appl. No. 10/789,326, 2 pages.
USPTO U.S. Appl. No. 10/789,625, 2 pages.

(Continued)

*Primary Examiner* — Augustine K Obisesan
(74) *Attorney, Agent, or Firm* — Stephen J. Walder, Jr.; Prentiss W. Johnson

(57) ABSTRACT

Mechanisms are provided for replicating transactions at a source database node on a target database node of the data processing system. A transaction message, for a transaction, is stored in a receive queue data structure of the target database node. An agent thread applies a change to data of the target database node based on a specification of the change in the transaction message. An identifier of the transaction message is stored in a done message data structure of the target database node and the identifier of the transaction message is also stored in a prune queue data structure of the target database node. A prune thread determines if a contiguous range of identifiers of transaction messages equal to or greater than a predetermined batch size is present in the prune queue data structure. If so, then a range of transaction messages is deleted from the done message data structure.

14 Claims, 7 Drawing Sheets

U.S. PATENT DOCUMENTS

| | | | |
|---|---|---|---|
| 5,995,980 | A * | 11/1999 | Olson et al. ............................ 1/1 |
| 6,029,177 | A | 2/2000 | Sadiq et al. |
| 6,029,178 | A | 2/2000 | Martin et al. |
| 6,058,389 | A | 5/2000 | Chandra et al. |
| 6,058,401 | A | 5/2000 | Stamos et al. |
| 6,061,689 | A | 5/2000 | Chang et al. |
| 6,067,541 | A | 5/2000 | Raju et al. |
| 6,073,140 | A | 6/2000 | Morgan et al. |
| 6,092,220 | A | 7/2000 | Palmer et al. |
| 6,105,017 | A | 8/2000 | Kleewein et al. |
| 6,122,630 | A | 9/2000 | Strickler et al. |
| 6,144,966 | A | 11/2000 | Roberts |
| 6,154,847 | A * | 11/2000 | Schofield et al. ............... 714/4.4 |
| 6,202,149 | B1 | 3/2001 | Hedegard |
| 6,209,000 | B1 | 3/2001 | Klein et al. |
| 6,301,589 | B1 | 10/2001 | Hirashima et al. |
| 6,343,219 | B1 | 1/2002 | Wada |
| 6,353,834 | B1 * | 3/2002 | Wong et al. ........................ 714/15 |
| 6,412,017 | B1 | 6/2002 | Straube et al. |
| 6,438,558 | B1 | 8/2002 | Stegelmann |
| 6,446,144 | B1 | 9/2002 | Habusha et al. |
| 6,466,950 | B1 | 10/2002 | Ono |
| 6,490,595 | B1 | 12/2002 | Candee et al. |
| 6,526,417 | B1 | 2/2003 | Perry |
| 6,594,676 | B1 | 7/2003 | Moore |
| 6,615,223 | B1 | 9/2003 | Shih et al. |
| 6,622,152 | B1 | 9/2003 | Sinn et al. |
| 6,668,260 | B2 | 12/2003 | Zoltan |
| 6,738,082 | B1 | 5/2004 | Dong et al. |
| 6,865,160 | B1 | 3/2005 | Bare |
| 6,889,231 | B1 | 5/2005 | Souder et al. |
| 6,934,727 | B2 | 8/2005 | Berkowitz et al. |
| 6,973,463 | B2 | 12/2005 | Merrells et al. |
| 6,973,464 | B1 | 12/2005 | Gao |
| 6,976,022 | B2 * | 12/2005 | Vemuri et al. ......................... 1/1 |
| 6,993,539 | B2 | 1/2006 | Federwisch et al. |
| 7,003,531 | B2 | 2/2006 | Holenstein et al. |
| 7,031,974 | B1 | 4/2006 | Subramaniam |
| 7,069,295 | B2 | 6/2006 | Sutherland et al. |
| 7,072,911 | B1 | 7/2006 | Doman et al. |
| 7,076,481 | B2 | 7/2006 | Osborne et al. |
| 7,076,508 | B2 | 7/2006 | Bourbonnais et al. |
| 7,085,764 | B2 | 8/2006 | Bangel et al. |
| 7,203,687 | B2 | 4/2007 | Adiba et al. |
| 7,203,712 | B2 | 4/2007 | Adiba et al. |
| 7,240,054 | B2 | 7/2007 | Adiba et al. |
| 7,330,860 | B2 | 2/2008 | Adiba et al. |
| 7,398,285 | B2 | 7/2008 | Kisley |
| 7,490,083 | B2 | 2/2009 | Bourbonnais et al. |
| 2002/0049776 | A1 | 4/2002 | Aronoff et al. |
| 2002/0145761 | A1 | 10/2002 | Ikeda |
| 2002/0156761 | A1 | 10/2002 | Chen |
| 2002/0165724 | A1 | 11/2002 | Blankesteijn |
| 2002/0188624 | A1 | 12/2002 | Landin et al. |
| 2003/0041074 | A1 | 2/2003 | Vasudevan et al. |
| 2003/0154238 | A1 | 8/2003 | Murphy et al. |
| 2003/0177194 | A1 | 9/2003 | Crocker et al. |
| 2003/0182319 | A1 | 9/2003 | Morrison |
| 2003/0187857 | A1 | 10/2003 | Ford et al. |
| 2003/0188035 | A1 | 10/2003 | Lubbers et al. |
| 2003/0208511 | A1 | 11/2003 | Earl et al. |
| 2004/0024771 | A1 * | 2/2004 | Jain et al. ....................... 707/100 |
| 2004/0162859 | A1 * | 8/2004 | Guo et al. ...................... 707/204 |
| 2004/0250032 | A1 * | 12/2004 | Ji et al. ........................... 711/162 |
| 2005/0102295 | A1 * | 5/2005 | Murray et al. ................. 707/100 |
| 2005/0108621 | A1 | 5/2005 | Kim et al. |
| 2005/0114285 | A1 * | 5/2005 | Cincotta ............................ 707/1 |
| 2005/0149578 | A1 * | 7/2005 | Sustman et al. ............. 707/200 |
| 2005/0193024 | A1 | 9/2005 | Beyer et al. |
| 2005/0193039 | A1 * | 9/2005 | Adiba et al. ................... 707/204 |
| 2005/0193041 | A1 * | 9/2005 | Bourbonnais et al. ........ 707/204 |
| 2005/0193093 | A1 * | 9/2005 | Mathew et al. ............... 709/219 |
| 2005/0223163 | A1 * | 10/2005 | Ogasawara et al. ........... 711/112 |
| 2005/0262055 | A1 | 11/2005 | Newport |
| 2006/0031286 | A1 * | 2/2006 | Sagawa .......................... 709/203 |
| 2006/0294333 | A1 | 12/2006 | Michaylov et al. |
| 2007/0067313 | A1 * | 3/2007 | Garza et al. ..................... 707/10 |
| 2007/0083569 | A1 * | 4/2007 | Wong et al. ................... 707/201 |
| 2007/0288537 | A1 | 12/2007 | Bourbonnais et al. |
| 2008/0098044 | A1 * | 4/2008 | Todd ............................. 707/202 |
| 2008/0163222 | A1 | 7/2008 | Bourbonnais et al. |
| 2009/0037398 | A1 * | 2/2009 | Horvitz et al. ..................... 707/4 |
| 2009/0132671 | A1 | 5/2009 | Chkodrov et al. |
| 2010/0161743 | A1 | 6/2010 | Krishnamurthi et al. |

OTHER PUBLICATIONS

USPTO U.S. Appl. No. 10/789,656, 2 pages.
USPTO U.S. Appl. No. 10/789,775, 3 pages.
USPTO U.S. Appl. No. 11/771,801, 3 pages.
USPTO U.S. Appl. No. 12/049,196, 2 pages.
http://dbforums.com/arch/69/2002/12/634367, 2002, 2 pages.
Bernstein, Philip A. et al., "Context-based prefetch—an optimization for implementing objects on relations", VLDB Journal, 2000, pp. 177-189.
Carino, Jr., Felipe et al., "StorHouse Metanoia—New Applications for Database, Storage & Data Warehousing", Storage & Data Warehousing, 2001, pp. 521-531.
Gao, Lei et al., "Application Specific Data Replication for Edge Services", May 2003, ACM Press, pp. 449-460.
Georgakopoulos, Dimitrios et al., "Chronological Scheduling of Transactions with Temporal Dependencies", 1990, pp. 1-28.
Haritsa, Jayant R. et al., "Value-Based Scheduling in Real-Time Database Systems", VLDB Journal, 2 117-152, 1993, pp. 117-126.
Haskin, Roger et al., "Recovery Management in QuickSilver", Feb. 1988, ACM Press, vol. 6, issue 1, pp. 82-108.
Jennings, Roger "SQL Server 2000 Gains on Oracle", Visual Basic Programmer's Journal, vol. 10, 2000, pp. 20-29.
Miled, Zina B. "Global Change Master Directory: Object-Oriented Active Asynchronous Transaction Management in a Federated Environment Using Data Agents", ACM 2001, pp. 207-214.
O'Connell, William et al., "Optimizer and Parallel Engine Extensions for Handling Expensive Methods Based on Large Objects", IEEE, 1999, pp. 304-313.
Pu, Calton et al., "Replica Control in Distributed Systems: An Asynchronous Approach", Apr. 1991, ACM Press, vol. 20, issue 2, pp. 377-386.
Stacey, Doug "Replication: DB2, Oracle, or Sybase?", Dec. 1995, ACM Sigmod record, vol. 24, issue 4, pp. 95-101.
Wolanow, A "One Enterprise, One Interface", Intelligent Enterprise, vol. 2, No. 4, Mar. 9, 1999, 1 page.
Yu, Haifeng et al., "Design and Evaluation of a Conit-Based Continuous Consistency Model for Replicated Services", ACM 2002, vol. 20, No. 3, pp. 239-282.
Interview Summary mailed Mar. 2, 2012 for U.S. Appl. No. 11/771,801; 2 pages.
Office Action mailed Jan. 17, 2012 for U.S. Appl. No. 12/049,196; 6 pages.
Office Action mailed Mar. 8, 2012 for U.S. Appl. No. 11/771,801; 16 pages.
Petition to Revive, RCE and Response to Final Office Action filed Dec. 23, 2011 for U.S. Appl. No. 10/788,556; 41 pages.
USPTO U.S. Appl. No. 13/437,198, 1 page.
Notice of Allowance mailed Jun. 11, 2012 for U.S. Appl. No. 12/049,196; 15 pages.
Office Action mailed Jun. 20, 2012 for U.S. Appl. No. 13/437,198; 27 pages.
Response to Office Action filed Apr. 11, 2012, U.S. Appl. No. 12/049,196, 12 pages.
USPTO U.S. Appl. No. 11/771,801, Pre-Appeal Brief Conference Arguments filed Jun. 6, 2012, 5 pages.
Appeal Brief filed with the USPTO on Sep. 27, 2012 for U.S. Appl. No. 11/771,801; 23 pages.
Notice of Allowance mailed Sep. 26, 2012 for U.S. Appl. No. 13/437,198; 12 pages.
Notice of Panel Decision from Pre-Appeal Brief Review mailed Aug. 30, 2012 for U.S. Appl. No. 11/771,801; 2 pages.
Response to Office Action filed with the USPTO on Sep. 18, 2012 for U.S. Appl. No. 13/437,198; 6 pages.

* cited by examiner

ASYNCHRONOUS DELETION OF A RANGE OF MESSAGES PROCESSED BY A PARALLEL DATABASE REPLICATION APPLY PROCESS

BACKGROUND

The present application relates generally to an improved data processing apparatus and method and more specifically to mechanisms for asynchronously deleting ranges of messages processed by a parallel database replication Apply program that does not require coordinated commits between the message delivery mechanism and a target database.

In a relational database management system, data is stored in a multiplicity of tables having a multiplicity of rows (records), the rows having a multiplicity of columns (fields). A subset of the columns are designated as key columns and the combination of values of the key columns of the rows of a single table must be distinct. It is frequently desired to maintain copies (replicas) of a first table residing in a first database of the relational variety in one or more other databases of the relational variety. Furthermore, it is desired that changes (inserts, deletes, and updates) to rows of the table in the first database be copied (replicated) to the table copies residing in the other databases. Additionally, it is sometimes desired that the changes made to any of the table copies residing in any of the several relational databases be copied (replicated) to all the other table copies.

The propagation of changes made to one copy of the table may be synchronous or asynchronous to the original change. Synchronous propagation makes changes at all copies as part of the same transaction (i.e. an atomic unit of work) that initiates the original changes. Asynchronous propagation copies the original changes to the other table copies in separate transactions, subsequent to the completion of the transaction initiating the original changes. Synchronous change propagation requires that the database management systems maintaining all (or most) copies be active and available at the time of the change. Also, synchronous change propagation introduces substantial messaging and synchronization costs at the time of the original changes.

The means of detecting changes to be propagated asynchronously can be active or passive. Active change detection isolates the changes, at the time of the change, for later processing using database triggers or a similar mechanism. Passive change detection exploits information from the database recovery log, where changes are recorded for other purposes, to deduce what rows of which tables were changed as well as both the old and new values of changed columns.

In a typical database environment, there are varying levels of parallel transactional processing involving concurrent transactions that execute read write actions against database information. Fundamental to the nature of a data replication process is the choice of how to move, order and apply that stream of parallel database event changes to a target database.

One conventional approach provides a certain degree of "apply" parallelism by grouping related tables into distinct sets and having each set of tables applied by a completely separate program. However, this approach places a heavy burden on the user. The user may have difficulty knowing which tables are logically related and must be grouped together.

In another conventional approach, parallelism is provided but without preserving the source data event order. Thus, to provide data integrity, a "shadow" table is used to track and maintain each individual data row change. This approach, however, has a significant overhead cost in both making updates and in performing lookups against the shadow table. Other conventional approaches provide parallelism but by using a very proprietary way that has no or limited applicability outside of a specific system.

SUMMARY

In one illustrative embodiment, a method, in a data processing system, is provided for replicating transactions at a source database node on a target database node of the data processing system. The method comprises receiving, in a receive queue data structure associated with a browser thread, a transaction message from the source database node and applying, by an agent thread, a change to data of the target database node based on a specification of the change in the transaction message in the receive queue data structure. The method further comprises storing an identifier of the transaction message in a done message data structure associated with the target database node and storing, by the browser thread, an identifier of the transaction message in a prune queue data structure associated with the target database node, in response to the transaction message being placed in the done message data structure. Moreover, the method comprises deleting, by a prune thread executing on the target database node, a batch of one or more completed transaction messages from the receive queue regardless of an order or sequence of the completed transaction messages in the receive queue. Furthermore, the method comprises determining, by the prune thread, whether a contiguous range of identifiers of transaction messages equal to or greater than a predetermined batch size is present in the prune queue data structure. In addition, the method comprises deleting a range of transaction messages from the done message data structure in response to a contiguous range of identifiers of transaction messages equal to or greater than the predetermined batch size being present in the prune queue data structure.

In other illustrative embodiments, a computer program product comprising a computer usable or readable medium, such as a computer usable or readable device, having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
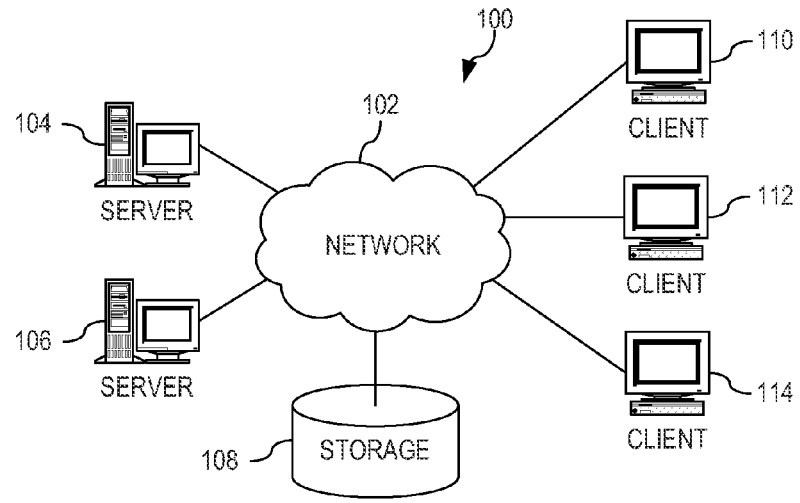
FIG. 1 is an example diagram of a distributed data processing system in which aspects of the illustrative embodiments may be implemented.

The illustrative embodiments provide an efficient mechanism for asynchronously deleting ranges of messages processed by a parallel database replication Apply program that does not require coordinated commits between the message delivery mechanism and a target database. The illustrative embodiments detect contiguous ranges of messages that have been processed by a parallel Apply program to aggressively delete the entries from the done message (DONEMSG) data structure (hereafter referred to as the DONEMSG table), thereby keeping the DONEMSG table small in size, i.e. having a small number of entries (or rows if one considers the DONEMSG table to be a table data structure) and thus, providing improved database performance. Moreover, the illustrative embodiments provide mechanisms for immediately deleting messages from the receive queue after they have been processed, thereby keeping the receive queue at its minimum size for better performance of the queuing system. Except during restart, the Apply program does not need to query the DONEMSG table to determine which messages have been processed. The mechanisms of the illustrative embodiments allow pruning of messages from queue structures without introducing additional overhead into the database replication process.

In one illustrative embodiment, mechanisms are provided for replicating transactions at a source database node on a target database node of the data processing system. The mechanisms capture one or more transactions at a source database node of the data processing system and send the transactions to the target database node using a queuing mechanism. A browser thread reads the transaction messages in order and queues non-dependent transactions for parallel apply in a work queue data structure where a pool of agents apply the transactions to the target database node in parallel. Each agent inserts a unique message identifier in the DONEMSG table in the same commit-scope as the transaction applied to the target database. An agent sends each committed transaction message in a done queue data structure to the browser thread and the browser thread sends an identifier of the transaction message in a prune queue data structure to the prune thread. The prune thread immediately deletes the messages from the queue mechanism resulting in messages being deleted in the order in which they were committed at the target (which is different than the order in which these messages arrived from the source). The deletes are batched for optimal performance. A prune thread executing on the target database node determines if a contiguous range of identifiers of transaction messages equal to or greater than a predetermined batch size is present in the prune queue data structure. A contiguous range of transaction messages are deleted from the DONEMSG table in response to a contiguous range of identifiers of transaction messages equal to or greater than the predetermined batch size being present in the prune queue data structure.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
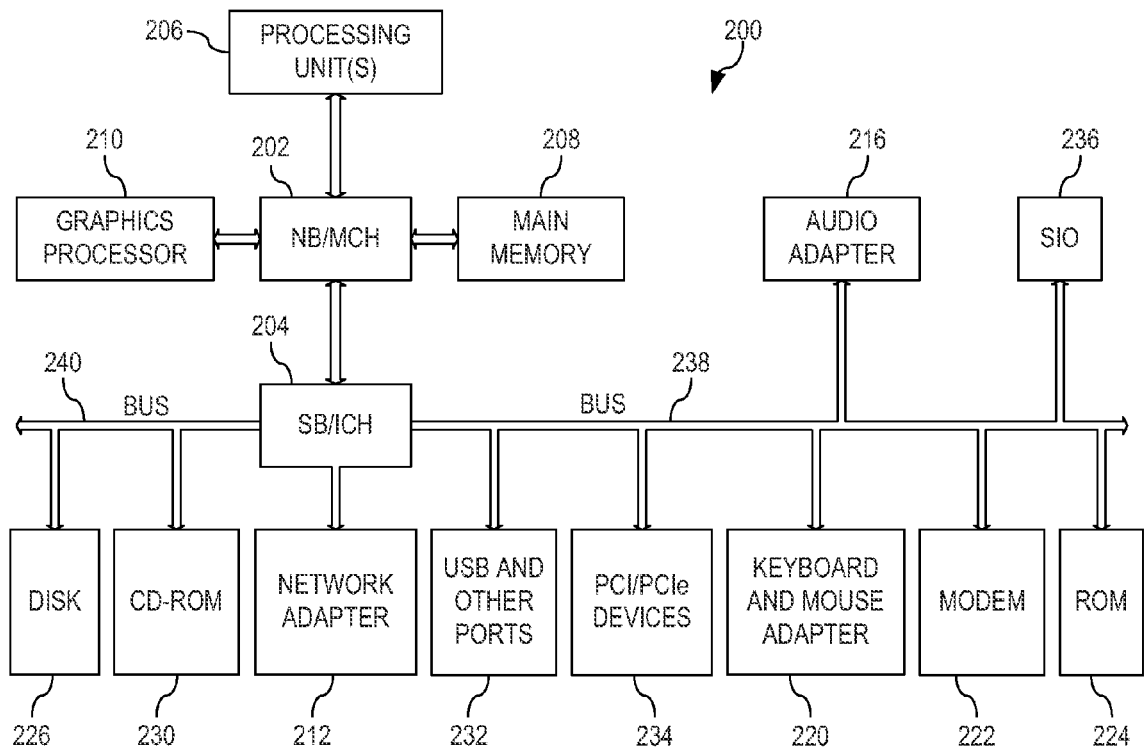
FIG. 2 is an example block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, one or more of the depicted computing devices in FIG. 1, e.g., the server computing device 104 and/or 106, may provide a relational database system having one or more relational databases that are managed by one or more relational database management systems that, among other things, manages replication of changes to databases within the relational database system, i.e. implements a database replication system. The relational database system may store in a plurality of tables having a plurality of rows (records), the rows having a plurality of columns (fields). The relational database management system(s) maintain copies (replicas) of a first table residing in a first relational database of the relational database system, in one or more other second relational databases. Furthermore, the relational database management system(s) replicates changes (inserts, deletes, and updates) to rows of the table in the first relational database, to the copies of the table residing in the other second databases. Moreover, the relational database management system(s) replicate changes made to any of the table copies residing in any of the several relational databases to all the other table copies.

In accordance with the mechanisms of the illustrative embodiments, in addition to replicating changes to databases in other databases as mentioned above, the illustrative embodiments provide mechanisms for managing messages used to perform the replication of changes to databases. These mechanisms for managing messages include mechanisms for asynchronously performing deletion of ranges of messages processed by a parallel database replication Apply mechanism. The mechanism for asynchronously performing the deletion does not require coordinated commits between the message delivery mechanism and a target database. To better understand the way in which the mechanisms of the illustrative embodiments operate, it is best to first understand an example of a relational database system that implements a database replication system using one or more relational database management system(s).

Figure 3:
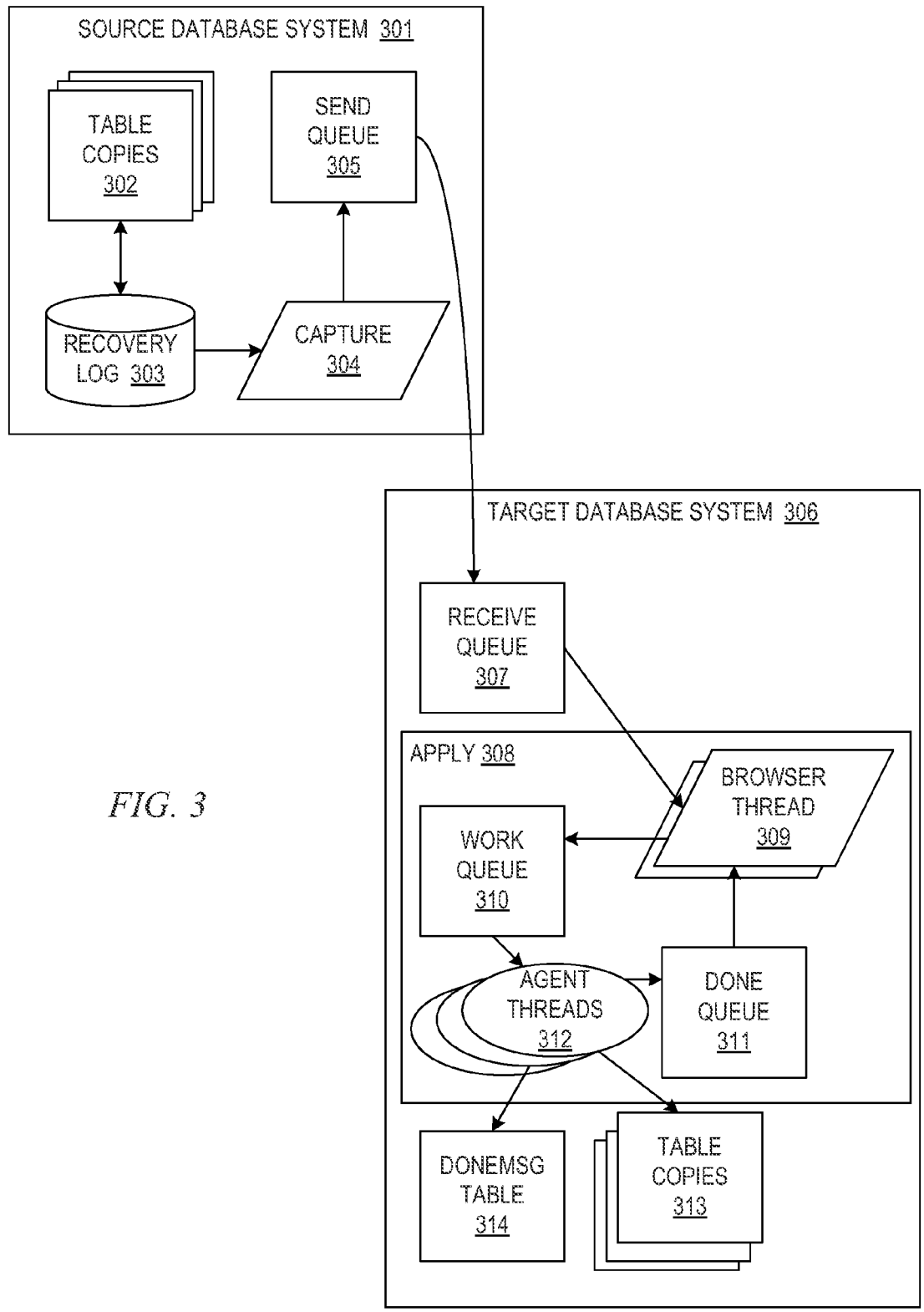
FIG. 3 illustrates an example of a system for providing parallel "apply" operations in asynchronous data replication in a database system.

FIG. 3 illustrates an example of a system for providing parallel "apply" operations in asynchronous data replication in a database system. The example system shown in FIG. 3 is a database replication system as described in commonly owned and co-pending U.S. patent application Ser. No. 12/049,196 entitled "Parallel Apply Processing in Data Replication with Preservation of Transaction Integrity and Source Ordering of Dependent States," filed Mar. 14, 2008. The system includes a source node 301 and a target node 306. These nodes may be computing devices, such as servers 104 and 106 in FIG. 1. At the source node 301 are one or more source table copies 302, a recovery log 303, a Capture program 304 ("Capture"), and a send queue 305. At the target node 306 are a receive queue 307, an Apply program ("Apply") 308 and one or more target table copies 312. Apply 308 includes a browser thread 309, a work queue 310, a done queue 311, and one or more agent threads 312. Capture 304 reads changes of committed transactions from the recovery log 303 and sends them to Apply 308 running on the target node 306. Apply 308 eventually re-executes the changes of the transactions.

The tabular data at the source table copies 302 whose changes are to be replicated to the target table copies 313 reside in a Relational Database Management System (RDBMS) such as the DB2® RDBMS product offered by International Business Machines Corporation. The RDBMS maintains a recovery log 303 and a means to query its contents. The entries of the recovery log 303 describe changes to rows of the source tables 302 at source node 301. More specifically, the entries in the recovery log 303 contain information defining (1) the table being changed, (2) the value of the key column in the row being changed, (3) the old and new values of all columns of the changed row, and (4) the transaction (unit of work) containing the change. Recovery log entries for inserted rows contain only new column values while recovery log entries for deleted rows contain only old column values. Recovery log entries for updated rows contain the new and old values of all row columns. The order of entries in the recovery log 303 reflect the order of change operations within each transaction and the order of transaction commit records reflects the order in which transactions are completed. The format of a row change log record can be abstracted as follows:

| Type | Transid | TableId | Old Key Cols. | Old Non-Key Cols. | New Key Cols. | New Non-Key Cols. |
|------|---------|---------|---------------|-------------------|---------------|-------------------|

To control the propagation of changes to table copies, copy control tables (not shown) designating table copies and their target table copies are used by the replication system. The control information includes, but is not limited to: (1) the name of the copied table, (2) a list of the table copies' key columns, (3) filtering and projection information, and (4) the message channels on which to send descriptions of changes to the target table copies.

The list of key columns defined for a replication definition will be hereafter referred to as the "replication key". The replication key should not be confused with other attributes of source or target table copies which may use primary key columns or foreign key columns. However, it is possible that the primary key of a source or target table copy may be comprised of the same set of columns as are specified for the replication key. The replication key uniquely identifies a row entity in a target table copy so that it can be located by Apply, in applying an update or delete change operation. Because the replication key uniquely identifies a row entity, it is used in the serialization of changes made to these unique row entities.

The type of row operation in change log records can be delete, insert, update, or key update. Updates that do not modify the replication key (update) are distinguished from updates that do modify the replication key (key update).

The changes made to table copies are determined by reading the recovery log 303. Changes are saved in memory until a transaction commit record is seen on the recovery log 303. Only committed transactions at the source node 301 are moved and applied to target nodes 306. Change records are grouped into their originating source transaction units and written as one logical message unit. Because a logical transaction message can be quite large, it may be broken down into a plurality of physical messages. In this specification, a "transaction message" refers to a logical transaction message. Changes to be sent to the other table copies are sent via logical message units on the recoverable queues (e.g., send queue 305 and receive queue 307) designated in the copy control tables for the table copies of the log records.

The transactions messages are put on the recoverable queue in the source commit order. Within each transaction, the change records are arranged in the order in which they occurred within the source transaction. In such a case, there is no inherent parallelism in the movement of the committed transactional data. The queuing of the transactional data is serialized such that data is moved to the target node 306 in the source transactional commit order.

In capturing the information for individual change records, the type of change operation for each change determines what replication key column values will be sent as part of that change record. For insert and update types of change records, the new replication key column values are sent as part of the change records within the transaction message. By definition, an insert is a new record and therefore has no old values. By definition, the new replication key column values of an update type of change record must be the same as the old replication key column values. For delete type change records, there is by definition no new record, only an old record, and therefore the old replication key column values are sent. For key update records, the old replication key column values are sent in addition to the new replication key column values.

For any given receive/recoverable queue 307 that is populated with transactions from a given source node 301 and is to be used as the source of changed data to be applied to a given target node 306, Apply 308 has a browser thread 309 and one or more agent threads 312, where the number of agents is determined through user input. The work queue 310 and the done queue 311 are structures internal to Apply 308, and are created for the purpose of communication between the browser thread 309 and the agent threads 312.

Figure 4:
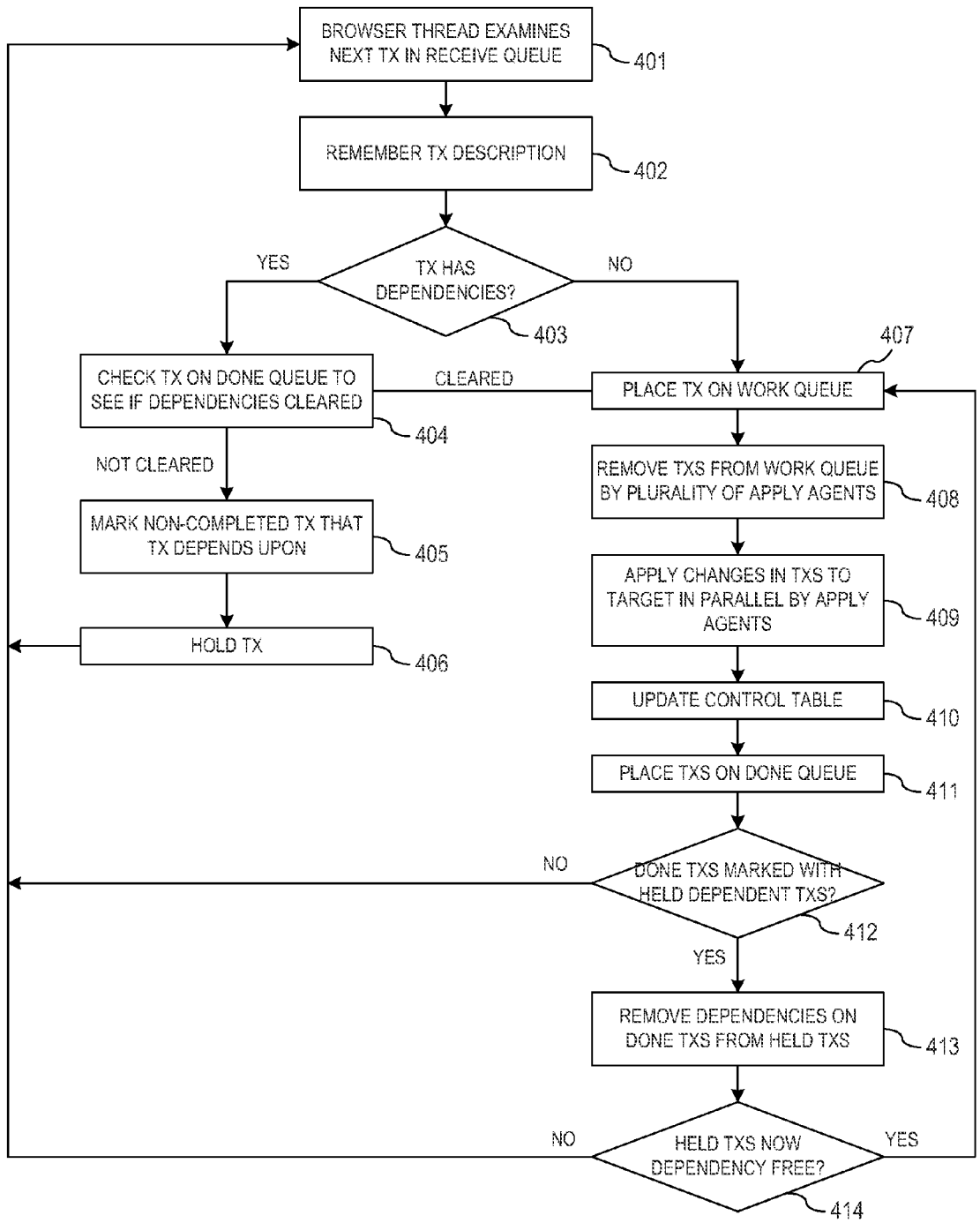
FIG. 4 is a flowchart illustrating an example operation for providing parallel apply in asynchronous data replication in a database system.

FIG. 4 is a flowchart illustrating an example operation for providing parallel apply in asynchronous data replication in a database system. First, the browser thread 309 examines the next transaction message in the receive queue 307 (step 401). The values of the replication key columns for each row change in the transaction message are stored in a logical data structure, such as in memory or the like (step 402). In this case, information describing the transaction, including the values of the replication key columns, is stored in a logical data structure and tracked. Other information concerning the transaction may also be stored. The logical data structure may also be used to track any preceding non-completed transaction messages, including any subsequent transaction messages that are dependent upon it.

The browser thread 309 determines if the transaction message has dependencies (step 403). A transaction message has a dependency if the preservation of the integrity of the data requires that one or more preceding non-completed transaction messages be applied prior to the application of the current transaction message. If the transaction message has dependencies, then the browser thread 309 checks the transaction messages on the done queue 311 to see if the completion of any of those transaction messages clears the dependencies (step 404). If not, then non-completed transaction messages upon which the transaction message is dependent are marked to indicate the transaction message's dependency (step 405). The current transaction message is also marked with its dependencies and held (step 406), and not allowed to be applied. If it does not have any dependencies, then the transaction message can be applied in parallel with the preceding transaction(s) currently being applied, and is thus placed on the work queue 310 (step 407). Once placed on the work queue 310, the transaction message becomes eligible to be applied by any available agent thread 312. The more agent threads 312 that are made available to be used, the more transaction messages which are eligible for application can be applied in parallel.

Each of a plurality of agent threads 312 look on the work queue 310, each removes a transaction message from the work queue (step 408). Each agent thread 312 then applies the row changes in the transaction message to the target table copies 313 in parallel with each other (step 409). All row changes from a transaction message are applied as a transaction unit, and are committed as a unit. In this case, committed as part of this transaction is an update of a control table to indicate that this transaction has been successfully committed at the target table copy 313 (step 410). The update is an insert of an entry into the control table (also referred to as the DONEMSG table) for the completed transaction. When the logical transaction message comprises a plurality of physical transaction messages, a plurality of entries, one for each physical transaction message, can be inserted. A control table in the same relational database as the target table copies 313 is used in order to provide for the best performance of this transaction application, while at the same time, keeping a permanent record of the successful application of the transaction. The insert to the control table is important for message cleanup of the receive queue 307, as described hereafter.

In one case, application of the changes is performed using generated Structured Query Language (SQL) statements of a non-proprietary nature. These SQL statements may or may not be exactly the same as the originating SQL statements made at the source node 301. However, the net effect of these changes is typically identical to the net effect of the changes made by the originating SQL statements. For example, an originating SQL statement such as "DELETE FROM SOURCE.TABLE" could be made. This statement would have the effect of deleting all rows from the table named SOURCE.TABLE. If there were five rows in the table at this point in time, then there would be five rows deleted, and five log records would be generated on the recovery log. Each log record would indicate the delete operation of one of the five rows. From the inspection of the recovery log, the five operations would be used to capture the information of five distinct data events, all of which occurred during a single transaction. This transaction would be queued and moved to the target node 306, and the application of these changes would be made as five distinct SQL statements, with each SQL statement targeting one of the individual rows of the corresponding target table copy. At the commit point of this applied transaction, the functional equivalence point is then reached, such that the same five rows have been deleted from the corresponding source and target table copies. Thus, a non-proprietary implementation of Apply is provided with this mechanism. This mechanism can be extended for use in any database that accepts standard SQL and has the general database property of atomicity.

Once the application is complete, the transaction message is placed on the done queue 311 (step 411). The indicators of held transaction messages dependent on this now completed transaction message, if any exist, which were previously marked (via step 405) can now be checked (step 412). These held transaction messages will be changed to remove the dependency or dependencies that existed regarding the now completed transaction message (step 413). After removal of these dependencies, each of the held transaction messages are checked to see if any other dependencies remain (step 414), against other preceding still non-completed transaction messages. Any held transaction message that is now determined to be dependency free (step 414), can be safely applied in parallel with the other transaction messages currently being applied, and thus placed on the work queue 310 (step 407). For held transaction messages with remaining dependencies, they remain as held transaction messages.

Figure 5:
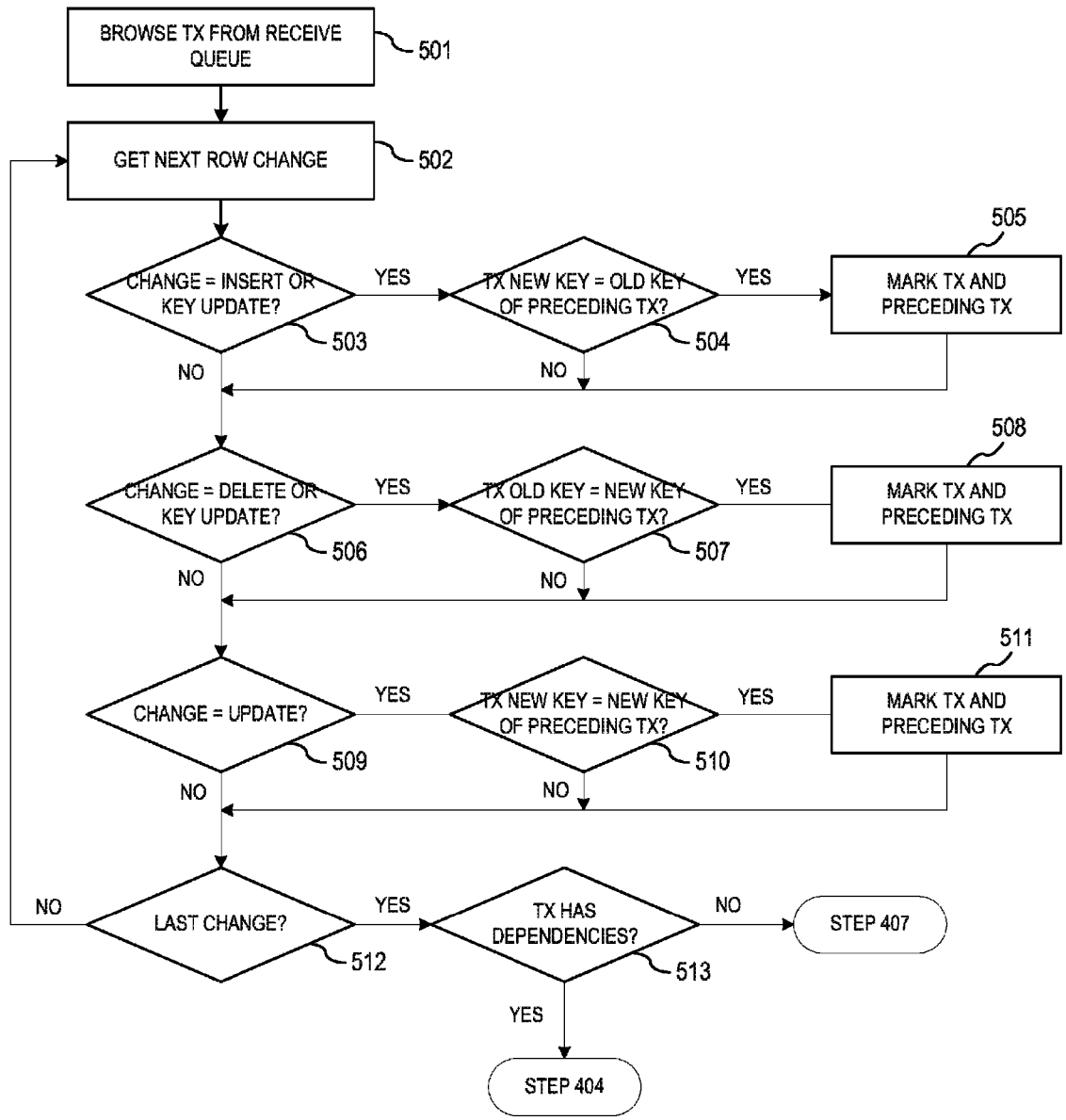
FIG. 5 is a flowchart outlining, in more detail, the determination of dependencies in the operation for providing parallel apply in asynchronous data replication in a database system.

FIG. 5 is a flowchart outlining, in more detail, the determination of dependencies in the operation for providing parallel apply in asynchronous data replication in a database system. For every transaction message that the browser thread 309 examines, critical pieces of information regarding that transaction are assessed and tracked. For each row change that makes up the transaction message, information regarding the values of the replication key columns is noted and tracked as part of that transaction. From the time of the initial examination of a transaction by the browser thread 309 until the eventual placement of that transaction message on the done queue 311 after successful application, the replication key column information for every row change within this transaction message is used to assess newly arriving transactions, to determine their eligibility for placement on the work queue 310. If a newly assessed transaction message contains row changes with replication key column values that match the values of the replication key columns from row change of any preceding transaction messages that have not yet completed, then this newly assessed transaction message is not eligible yet for application and must not yet be placed on the work queue 310.

As illustrated in FIG. 5, the browser thread 309 examines a transaction message in the receive queue 307 (step 501). The transaction message can contain a plurality of row changes. For each of the row changes, steps 502 through 512 are performed. The browser thread 309 examines the next change in the transaction message (step 502). If the type of change is an insert or key update (step 503), then the browser thread 309 determines if the new replication key value of the insert or key update change is the same as the old replication key value of any preceding non-completed transaction messages (step 504). If they are the same, then the preceding non-completed transaction message is marked to indicate the transaction message's dependency, and the transaction message is marked to indicate the preceding non-completed transaction message upon which it depends (step 505).

The new replication key column values of an insert or key update type of row change represent the introduction of a new row entity. Either of these row actions could have been preceded by a delete of that row entity (carrying old replication key column values) or by a key update which had the net effect of a delete followed by an insert, where it would be the delete aspect of the prior row action that could potentially have commonality with this row action and is therefore of interest. Therefore, the new replication key column values of an insert or key update row change are compared to the old replication key column values of all preceding non-completed transaction messages.

The method by which it is determined that a new or old replication key value is the same as another new or old replication key value can be relaxed so long as the same replication key values are not determined to be different. Those with ordinary skill in the art at the time of the invention will recognize that the comparison of the result of any deterministic function (e.g., a hash code function) can be used to insure that identical replication key values are matched, while differing replication key values may be incorrectly matched. The performance benefits of simplified comparing can outweigh the loss of parallelism due to incorrectly matched replication key values.

If the type of change is a delete or a key update (step 506), then the browser thread 309 determines if the old replication key value of the delete or key update change is the same as the new replication key value of any preceding non-completed transaction message (step 507). If they are the same, then the preceding non-completed transaction message is marked to indicate the transaction message's dependency, and the transaction message is marked to indicate the preceding non-completed transaction message upon which it depends (step 508).

The new replication key column values of an update type of row change represent the change of non-replication key column values of an existing row entity. This row action could have been preceded by an insert of that row entity (carrying new replication key column values), or by a key update which had the net effect of a delete followed by an insert, where it would be the insert aspect of the prior row action that could potentially have commonality with this row action and is therefore of interest. Therefore, the new replication key column values of an update row change are compared to the new replication key column values of all preceding non-completed transaction messages.

If the type of change is an update (step 509), then the browser thread 309 determines if the new replication key value of the update change is the same as the new replication key value of any preceding non-completed transaction message (step 510). If they are the same, then the preceding non-completed transaction message is marked to indicate the transaction message's dependency, and the transaction message is marked to indicate the preceding non-completed transaction message upon which it depends (step 511).

The old replication key column values of a delete or key update type of row change represent the deletion of an existing row entity. Either of these row actions could have been preceded by an insert of that row entity (carrying new replication key column values), by an update of that row entity (carrying new replication key column values), or by a key update which had the net effect of a delete followed by an insert, where it would be the insert aspect of the prior row action that could potentially have commonality with this row action and is therefore of interest. Therefore, the old replication key column values of a delete or key update row change are compared to the new replication key column values of all preceding non-completed transaction messages.

Once the last change in a transaction message has been examined (step 512), and the transaction message is determined to have dependencies (step 513), the process continues with step 404 in FIG. 4. If the transaction message is determined to have no dependencies, then the process continues with step 407 in FIG. 4.

With these mechanisms, whole source transactions are executed as whole target transactions, and changes to any individual table row entity, as determined by the specified and required replication key column values, are serialized to the same degree that those changes were serialized at the source database. Transactions with no dependencies are likely to be committed in a different order from the source commit order.

Figure 6:
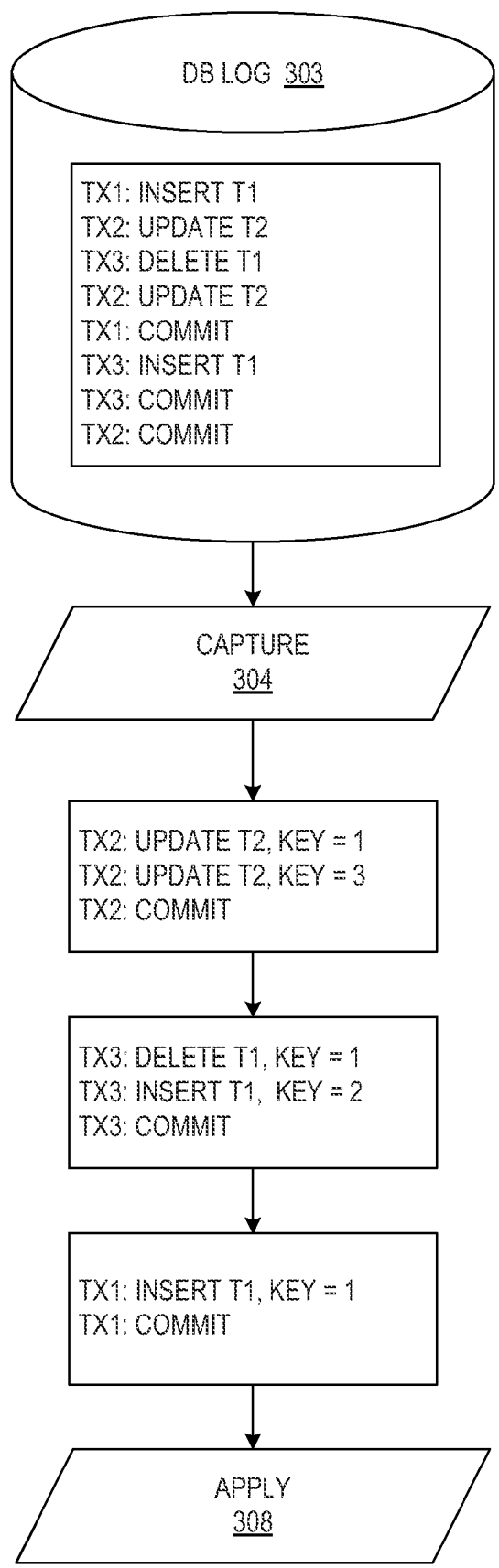
FIG. 6 illustrates an example of the method for providing parallel apply in asynchronous data replication in a database system.

FIG. 6 illustrates an example of the method for providing parallel apply in asynchronous data replication in a database system. The transaction data found in the recovery log 303 is grouped by transaction and those transactions are sent to the send queue 305 in source commit order. For example, transaction 1 (Tx1), transaction 2 (Tx2), and transaction 3 (Tx3) were started in Tx1-Tx2-Tx3 order, but were committed in Tx1-Tx3-Tx2 order. Thus, they are sent to the receive queue 307 in committed Tx1-Tx3-Tx2 order.

When Tx1 arrives on the receive queue 307, the browser thread 309 examines Tx1 (step 401). Information concerning Tx1 is stored (step 402). Such information includes the fact that Tx1 involves an insert into table T1 of a row with replication key value=1. Since there are no preceding transactions, Tx1 has no dependencies (step 403). Tx 1 is thus placed on the work queue (step 407).

As Tx1 is removed from the work queue (step 408), and being applied (step 409), the browser thread 309 examines Tx3 (step 401). Information concerning Tx3 is remembered (step 402). Such information includes the fact that Tx3 involves a delete from table T1 of a row with replication key value=1 and an insert into table T1 a row with replication key value=2. The browser thread 309 determines that Tx3 has a dependency for table T1 delete, since the old replication key value of the delete (key=1) is the same as the new replication key value for the insert in Tx1 (step 507). Assuming that Tx1 has not yet completed, there are no transaction messages on the done queue 311 so steps 404 and 405 are not performed. Tx 1 is thus marked to indicate the dependency of Tx3, and Tx3 is marked to indicate it is dependent upon Tx1 (step 508). Tx3 is held (step 406).

The browser thread 309 next examines Tx2 after it arrives on the receive queue 307 (step 401). Information concerning Tx2 is remembered (step 402). Such information includes the fact that Tx2 involves an update in table T2 of a row with replication key=1, and an update in table T2 of a row with replication key=3. The browser thread 309 determines that Tx2 has no dependencies (step 403) (and step 510), and places Tx2 on the work queue 310 (step 407).

When application of Tx1 completes (step 409), the control table is updated to indicate its completion (step 410). Tx1 is also placed on the done queue 311 (step 411). From the marks added to Tx1 above, the browser thread 309 knows to remove from Tx3 its dependency upon Tx1. The browser thread 309 then checks if Tx3 is now dependency free (step 412). Since Tx3 is now dependency free, it is placed on the work queue (step 407).

In this case, the receive queue 307 is a persistent queue, while the work queue 310 and the done queue 311 are not. The persistence of the receive queue 307 is to protect the integrity of the data in case of a system failure or some other interruption during the transaction application process. However, the persistent nature of the receive queue 307 requires that messages in the receive queue 307 be removed after transactional messages have been successfully applied. Otherwise, if the process is interrupted, the system upon restart will attempt to apply the changes in the transaction messages on the receive queue 307 again, leading to errors.

One possible method of removal is a two-phase commit approach, where the delete of the message from the receive queue 307 is committed as part of the same transaction at the target node 306 that applies the changes. Another method is to use an asynchronous "cleanup" approach, as described below. The asynchronous cleanup approach has the advantage of defraying the delay and overhead costs associated with the two-phase commit approach.

In the asynchronous cleanup approach, it is noted that a control table is updated and committed as part of the transaction that applies the changes associated with a logical replication transaction message at a target node 306. This allows for a background task to be executed on a periodic basis which deletes messages from the receive queue 307 based on the existence of an entry in the control table indicating that this message has been successfully applied. After the delete of one or more logical transaction messages from the receive queue 307 has been committed, entries for the logical transmission message from the control table can be safely removed. If the logical transaction message comprises a plurality of physical transaction message, then each physical transaction has its own entry in the control table. Each entry for the physical messages is individually removed. This approach avoids the cost of a two-phase commit since the control table rows are deleted after the committed delete of the messages on the receive queue 307. If entries in the control table exist without corresponding queue messages because those messages have already been deleted due to some process interruption, this poses no possible harm to the system, and such extra control table rows can be safely removed at anytime.

Referring again to FIG. 3, using the database replication system described above as an example, message queues, e.g., send queue 305 and receive queue 307, are used to deliver database transactions that are captured at a source database system 301 and applied at a target database system 306. The message queue structures 305 and 307 reside in a queuing mechanism that is outside of the database management system (DBMS). The queuing mechanism provides the ability to stage the messages.

The messages in the message queue structures must be deleted after the changes are committed at the target database. For performance reasons, as noted above, a coordinated two-phase commit protocol is not used between the queuing mechanism and the target database. For example, when a two-phase commit protocol is used, it has been observed that the Apply program 308 can take up to 10× more time to apply the replicated transactions. Instead, the done message (DONEMSG) data structure, also known as the DONEMSG table, 314 is used to maintain the identifiers of the message already processed. Messages are processed in parallel by the Apply program 308 using multiple Apply agent threads 312, each processing one or more messages. If the Apply program 308 is stopped and restarted, it is possible to determine which messages have been processed by reading the entries in the DONEMSG table 314. The Apply program 308 tolerates messages that have an entry in the DONEMSG table 314, but have already been deleted from the receive queue 307.

The Apply program 308 processes can be aborted at any time. However, a message that was previously processed by the Apply program 308 must not be processed again if and when the Apply program 308 is restarted. The Apply program 308 can only delete a message from the receive queue 307 after the changes this message contained have been committed to the target database's table copies 313.

Messages arrive in the receive queue 307 in the commit order of the changes at the source database system 301. However, because messages are processed in parallel using the multiple Apply agent threads 312, and the transactions take variable amount of time to complete, and non-dependent transactions can be completed in any order, the messages to delete from a queue, such as receive queue 307, are not contiguous.

The messages contain a sequence identifier that is generated by the capture program 304 and which is used by the Apply program 308 to detect lost messages. The sequence identifier includes at least a sequence time (timestamp) and a monotonically increasing sequence number. A new sequence time is generated by the Capture program on the source database system 301 whenever replication is reinitialized. Replication may be reinitialized when the user wants to reset both sides (the source database system 301 and target database system 306) and start-over. When a new sequence time is generated, the sequence number is reset to 1. The Apply program 308 checks that messages are contiguous and increasing based on the sequence identifier. A maximum message identifier is retained in the DONEMSG table 314 for each receive queue 307. The maximum message identifier is read by the browser thread 309 on startup of the browser thread 309. This assists the browser thread 309 to start processing from a correct point in the receive queue 307.

When pruning from the DONEMSG table 314, i.e. when deleting messages from the DONEMSG table 314, the Apply program 308 can delete all rows from the DONEMSG table 314 except the row containing the maximum message identifier (Max MSGID). This is done so that the Apply program 308 knows the restart point for reading from the DONEMSG table 314 after the Apply program 308 has successfully deleted the corresponding messages from the receive queue 307.

In a high volume database replication system, such as that described above, it is not uncommon to replicate hundreds of millions of transactions a day. There is very high activity on the receive queue 307 and the DONEMSG table 314. A delay of a few minutes in pruning messages from these queues may result in the accumulation of millions of messages as well as the DONEMSG table 314 growing to millions of entries, resulting in performance degradation that can be compounding with the constant arrival of new messages. Slow pruning can lead to the receive queue 307 filling up, which can force the replication process to stop. Performance degrades as the queues grow larger because it introduces more processor, memory, and input/output overhead in the queuing mechanism.

Queries against the DONEMSG table 314 to determine if a message has already been applied become more expensive when the DONEMSG table 314 grows larger. Pruning the DONEMSG table 314 is costly if done one row at a time. In addition, a low-overhead mechanism is desirable for efficiently and aggressively keeping the receive queue 307 and DONEMSG table 314 to a minimum size without introducing overhead into the replication process. It is also highly desirable to keep a minimum number of processed messages in the receive queue 307.

The illustrative embodiments provide such mechanisms by providing an efficient method of pruning the DONEMSG table 314, and other queue structures, which leverages database set operations. This pruning id done asynchronously using batch operations so as to avoid introducing overhead into the replication process. Moreover, to keep a minimum number of processed messages in the receive queue, messages are pruned from the receive queue 307 immediately after they have been processed. It can be determined that a message has been processed after the insertion of its message identifier (msgid) has been committed into the DONEMSG table 314.

Keeping the DONEMSG table 314 small allows faster restart of the replication process. On restart, the Apply program 308 determines where to start reading the receive queue 307, skipping already processed messages. The Apply program 308 on restart first deletes all already processed messages and their corresponding entry in the DONEMSG table 314. The larger the DONEMSG table 314, the longer the restart time.

Operations against the target database system 306 are costly and should be minimized. The Apply program 308 should not have to query the DONEMSG table 314 to determine which messages can be deleted except during recovery upon restart. Pruning of the DONEMSG table 314 should be done using a minimum number of Structured Query Language (SQL) operations. For example, a single SQL statement that deletes a large number of contiguous rows, for which the database management system will be able to use an index to retrieve the data, will be much more efficient than issuing an individual SQL statement for each row that is to be deleted.

As mentioned above, the illustrative embodiments provide mechanisms for efficiently detecting contiguous ranges of messages that have been processed by a parallel Apply program to aggressively delete the entries from the DONEMSG table, thereby keeping the DONEMSG table small in size, i.e. having a small number of entries (or rows if one considers the DONEMSG table to be a table data structure) and thus, providing improved database performance. Moreover, the illustrative embodiments provide mechanisms for immediately deleting messages from the receive queue after they have been processed, thereby keeping the receive queue at its minimum size for better performance of the queuing system. Except during restart, the Apply program does not need to query the DONEMSG table to determine which messages have been processed.

Figure 7:
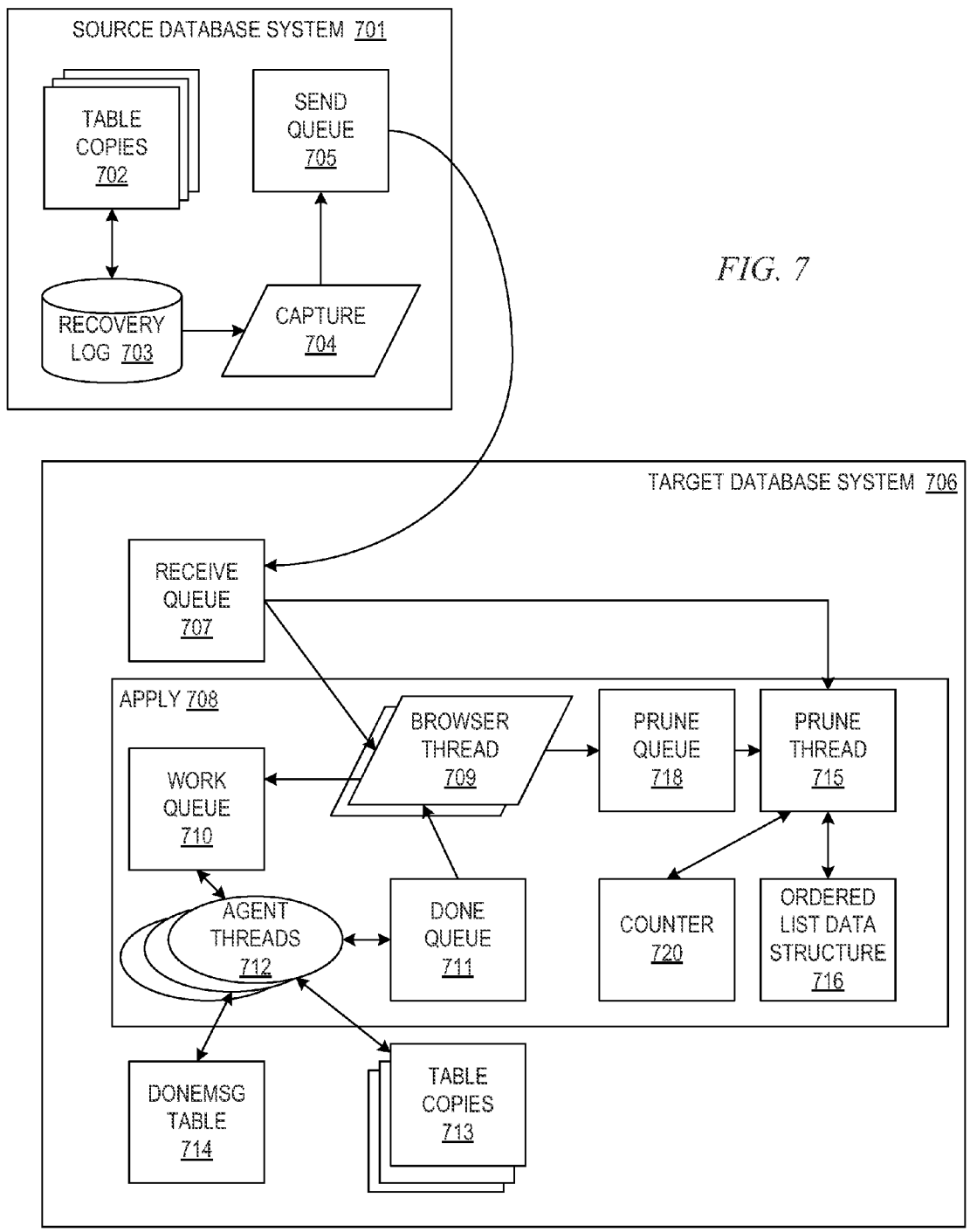
FIG. 7 is an example block diagram of an improved database replication system in accordance with one illustrative embodiment.

FIG. 7 is an example block diagram of an improved database replication system in accordance with one illustrative embodiment. With the exception of the prune thread 715, the ordered list data structure 716, the prune queue 718, and counter 720, the elements shown in FIG. 7 are similar to corresponding elements shown in FIG. 3 described above. The similar elements, however, may be modified to operate in conjunction with the new elements 715-720 as described hereafter. It should be appreciated that, similar to FIG. 3, the source database system 701 and target database system 706 may be computing devices, such as servers or the like, with the elements shown within the source database system 701 and target database system 706 being implemented as software instructions executed by one or more processors of the respective systems and/or data structures stored in storage devices, such as a memory, hard disk, or the like, of the respective systems.

With reference to FIG. 7, the Apply program's prune thread 715 asynchronously prunes the DONEMSG table 714 and the receive queue 707 for all browser threads 709. The prune queue 718 is an in-memory queue used for communicating between the browser threads 709 and the prune thread 715. It is important to note that no SQL SELECT statements are issued against the DONEMSG table 714 to identify messages to prune during the Apply operation. Instead a protocol is established between the prune thread 715 and the browser thread 709 as described hereafter.

In accordance with a prune handshake protocol, each browser thread 709, on startup or shutdown, communicates with the prune thread 715 to register or de-register its corresponding receive queue 707 for pruning. For example, on startup, a browser thread 709 registers its receive queue 707 for pruning with the prune thread 715 by sending a START_PRUNING message that contains the maximum message identifier (MSGID) from the DONEMSG table 714. The maximum message identifier represents the largest sequence number for a received message received in the Receive Queue 707. If the DONEMSG table 714 is empty, then instead of the maximum message identifier, a null value is provided in the START_PRUNING message.

The prune thread 715 records the browser thread's receive queue identifier and the maximum MSGID as the starting point for pruning. If the DONEMSG table 714 was empty, then the prune thread 715 records that a maximum MSGID was not seen and waits for a maximum MSGID with a sequence number of 1 before starting pruning. In addition, the prune thread 715 creates a new in-memory ordered list data structure 716 to record the message identifiers (MSGIDs) for messages received by the receive queue 707, adds the MSGID information to this list data structure 716, and opens a connection with the receive queue 707, if needed, so that the prune thread 715 can starting pruning the receive queue 707.

On the other hand, when a browser thread 709 is stopped, the browser thread 709 de-registers its receive queue 707 from the prune thread 715 by sending a STOP_PRUNING message to the prune thread 715 over the prune queue 718. The prune thread 715 immediately stops pruning the corresponding receive queue 707, closes the connection to the corresponding receive queue 707, if needed, and deletes the ordered list data structure 716 associated with the browser thread 709.

In accordance with a message protocol between the browser thread 709 and the prune thread 715, the browser thread 709 informs the prune thread 715 that a message has been processed and is eligible for pruning by sending a MSGID notification to the prune thread 715 via the prune queue 718. Each browser thread 709 receives completed transactions from its corresponding agent threads 712 via the done queue 711. For each transaction received, the browser thread 709 sends the corresponding MSGIDs to the prune thread 715 via the prune queue 718.

When a transaction is too large to fit into the memory of the target database system, it is referred to as a "monster" transaction. A monster transaction is delivered using several messages. When a monster transaction is received, parallelism is turned off because the transaction is directly applied by the browser thread 709. It is not handed to the agents for parallel apply.

The browser thread 709 processes a monster transaction in chunks such that at any given point in time, only a portion of the transaction is buffered in memory. The browser thread 709 applies the monster transaction by reading enough transaction messages to fill the memory, applying the partially read transaction, discarding all message to free up the memory, and repeating this process until a last message has been processed at which time a database commit is issued. The browse thread 709 waits for a database commit operation before sending the monster transaction's MSGIDs to the prune thread 715. The browser thread 709 maintains a list of all the MSGIDs of the monster transaction in the list data structure 716. After the database commit operation, the browser thread sends the MSGIDs to the prune thread 715.

Control messages are sent by the capture program 704 to make changes to the replication environment. For example, a control message is sent to subscribe a new database table 702 for replication. These messages are processed directly by the browser thread 709 and are also subject to pruning after they have been processed. The browser thread 709 sends a notification, to the prune thread 715 via the prune queue 718, for every control message processed after its corresponding MSGIDs have been committed to the DONEMSG table 714.

In addition to the handshake protocol and message protocol described above, the illustrative embodiments provide pruning mechanisms for pruning the receive queue 707 and DONEMSG table 714. The pruning mechanisms implement a pruning operation to prune both the receive queue 707 and the DONEMSG table 714. With this pruning operation, the browser thread 709 prunes the receive queue 707 and DONEMSG table 714 only during a startup and shutdown operation to determine the starting point from which messages should be processed from the receive queue. However, during normal operation the browser thread 709 is only responsible for reading the transaction messages from the receive queue 707 and scheduling them for parallel apply. This allows the system to achieve optimal performance. While one thread (browser) reads the transaction messages without performing expensive deletes, another thread (prune) handles the expensive task of pruning messages. The pruning performed by the browser thread 709 on startup is similar to what is described above with regard to asynchronous cleanup approach in FIG. 3.

During Apply 708 operations, the prune thread 715 performs these tasks asynchronously for optimal performance. The browser thread 709 is responsible for registering with the prune thread 715 the receive queue 707 to be pruned and sends MSGID notifications for completed transactions or control messages to the prune queue 718. Messages are deleted from the receive queue 707 under transactional control and the deletion of the messages in the receive queue 707 are committed when a batch_size is reached. That is, certain queuing mechanisms, such as IBM's MQ Series, allow applications to delete messages from a queue, but the messages are not deleted until the application issues a COMMIT operation. This allows applications to reduce the overhead of I/O needed for a COMMIT operation by batching several operations together and issuing a single COMMIT for all the operations. This is referred to as transactional control.

A determination that the batch_size has been reached may be made by the prune thread 715 by comparing a counter 720 value to a pre-defined batch_size value to see if the counter 720 value is equal to or greater than the pre-defined batch_size value. The counter 720 may be incremented with each message deleted from the receive queue 707 by the prune thread 715. If the batch_size is not reached during the Apply operation, the commit will take place during shutdown by the browser thread 709.

The prune thread 715 also checks the ordered list data structure 716 to determine if a contiguous range of messages, i.e. a range of messages having consecutive MSGIDs with no gaps, having a size equal to or greater than the batch_size value is present in the ordered list data structure 716. If a contiguous range of messages is found in the ordered list data structure 716, then a single range-based delete command, e.g., a SQL DELETE statement, is executed against the DONEMSG table 714. Upon a successful execution of the delete command, any outstanding changes on the receive queue are committed first and database changes are committed after. This order allows for recovery in the event that the application crashes after the messages have been deleted from the receive queue but before the entries are deleted from the DONEMSG table 714. In such cases, the browser thread 709 on startup individually deletes all entries in DONEMSG table 714 and the corresponding messages in the receive queue 707, as described with regard to the asynchronous cleanup approach in FIG. 3, before processing any new messages in the receive queue 707. This guarantees that messages are processed exactly once. The just deleted range of messages are then removed from the in-memory ordered list data structure 716 and if the highest MSGID in the deleted range of messages is bigger than the maximum MSGID, then the maximum MSGID is updated to equal the highest MSGID. If the delete command does not complete successfully, then the operation stops.

If a contiguous range of messages is not found in the in-memory ordered list data structure 716, then the point up to which MSGIDs are contiguous is stored, i.e. the highest MSGID of the contiguous range is stored. This becomes the starting point of the search for a contiguous range of messages equal in size to the batch_size in a next iteration of the pruning operation. The pruning thread 715 then waits for more messages from the browser thread 709 before determining to inspect the ordered list data structure 716 again. There is also a time-based criteria to check for a range of messages. This is done so that if multiple batches become eligible at the same time, due to multiple notifications, the prune thread can issue the delete-by-range without waiting for a new notification.

Figure 8:
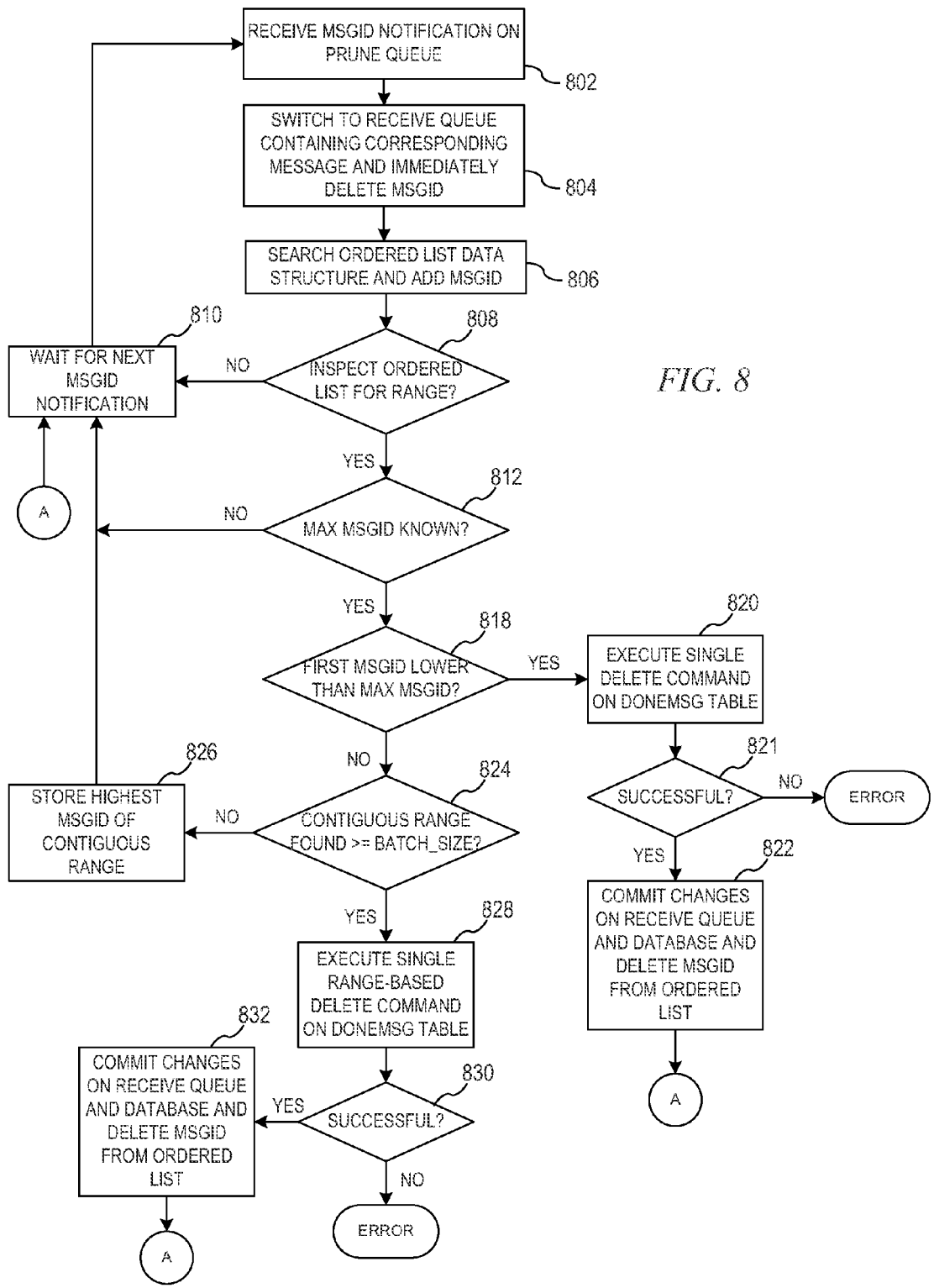
FIG. 8 is a flowchart outlining an example pruning operation in accordance with one illustrative embodiment.

FIG. 8 is a flowchart outlining an example pruning operation in accordance with one illustrative embodiment. As shown in FIG. 8, the operation of the pruning thread starts with the receive of a MSGID notification on the prune queue (step 802). This MSGID notification is sent from a browser thread in response to a transaction being completed by the agent thread on a table copy in the target database system. In response to receiving the MSGID notification, the prune thread switches to the receive queue that contains the message with the MSGID identified in the MSGID notification and deletes the message from the receive queue (step 804). The deletion of the message is not committed on the receive queue until the batch_size is reached, as described hereafter. While changes to queues are not committed, they are present in a recovery log data structure (not shown) in case the message needs to be processed again in the event of a stop and restart of the database replication process.

The ordered list data structure corresponding to the receive queue is searched backwards and the MSGID received in the MSGID notification is added to the list of MSGIDs for this receive queue (step 806). A determination is made as to whether it is time to inspect the ordered list data structure for a contiguous range of messages having a total number, or size, equal to a pre-established batch_size (step 808). The determination as to whether to inspect the ordered list data structure may be performed based on various criteria. For example, the determination may be based a number of MSGIDs having been received in MSGID notifications that equals some multiple of the batch_size. This determination may be made based on a counter value that is maintained by the prune thread that increments when a MSGID notification is received and whose value may be compared to the batch_size or multiple of the batch_size. The counter value may be reinitialized in response to an inspection of the ordered list data structure is performed. As another example, a timer may be used such that when the timer expires, the search of the ordered list data structure for a contiguous range of MSGIDs equal in size to the batch_size may be performed. Other criteria may likewise be used to determine when to search the ordered list data structure for the contiguous range of MSGIDs without departing from the spirit and scope of the illustrative embodiments.

If it is not time to perform a search of the ordered list data structure for the contiguous range of MSGIDs, then the operation waits for a next MSGID notification (step 810) and in response to receiving a next MSGID notification, returns to step 802. If it is determined that it is time to perform a search of the ordered list data structure, then it is determined whether the maximum MSGID is known or not (step 812). If the maximum MSGID is not known, then a check is made as to whether the first element in the ordered list data structure has a sequence number of 1 (step 814). If so, then the sequence number 1 becomes the maximum MSGID (step 816). If not, then the prune thread waits for a MSGID to be added to the ordered list data structure that has a sequence number of 1. This is done by going to step 810.

If the maximum MSGID is known (step 812), and the first MSGID in the ordered list data structure is lower than the maximum MSGID (step 818), then a single delete command is executed against the DONEMSG table (step 820). On a successful execution of the delete command, any outstanding changes on the receive queue are committed first, database changes are committed next, and the deleted MSGID is removed from the in-memory ordered list data structure (step 822). If the delete command is not executed successfully, then an error occurs and the operation stops.

If the maximum MSGID is known, and the first MSGID in the ordered list data structure is higher than the maximum MSGID, then a determination is made as to whether a contiguous range of MSGIDs equal or greater in size to a batch_size is found in the ordered list data structure (step 824). If a contiguous range of MSGIDs is not found in the ordered list data structure, then a highest MSGID up to which MSGIDs are contiguous is stored (step 826). This becomes the starting point of the search in the next iteration. The operation then continues to step 810 where more MSGID notifications are received and MSGIDs are added to the ordered list data structure.

If a contiguous range of MSGIDs equal or greater in size than the batch_size is found in the ordered list data structure, then a single range-based delete command is executed against the DONEMSG table (step 828). If the single range-based delete command executes successfully, then any outstanding changes on the receive queue are committed first and database changes are committed next (step 830). The just deleted range of messages are removed from the in-memory ordered list data structure and the maximum MSGID is updated if necessary (step 832). The maximum MSGID is updated if the highest MSGID in the deleted range is larger than the old maximum MSGID. The operation then goes to step 810 and awaits the next MSGID notification. If the single range-based delete command does not execute successfully, then the operation terminates with an error.

It should be noted that the prune thread can receive MSGIDs in a random order since the Apply program executes transactions in parallel. This may result in gaps in the message sequence in the ordered list data structure. Gaps can occur, for example, when an agent thread applies non-dependent transactions in parallel. In such a case, it is possible that a transaction coming later in the receive queue is processed before a transaction ahead in the receive queue. In this case, the MSGIDs are out-of-order, resulting in gaps.

In another example, the Apply's parallelism can cause gaps in the MSGIDs on startup. For example, with 8 Apply agents applying transactions TXS1 through TXS8, if only TXS2 and TXS6 were committed in a prior shutdown, the receive queue has transactions TXS1, TXS3, TXS4, TXS5, TXS7, and TXS8. The maximum MSGID in the DONEMSG table corresponds to TXS6, but Apply must still process TXS1, TXS3, TXS4, and TXS5 before processing TXS7 and TXS8.

The first scenario is addressed by maintaining the ordered list of MSGIDs. Starting with the maximum MSGID, the prune thread waits for all MSGIDs in the sequence before issuing the range-based delete command on the DONEMSG table. For example, if the maximum MSGID on startup is MSGID10 and the batch size is 5, the prune thread waits for MSGID11, MSGID12, MSGID13, MSGID14, and MSGID15 before issuing a range-based delete command from MSGID11 to MSGID 15, regardless of the order in which the transactions corresponding to these MSGIDs are committed.

The second scenario set forth above is addressed by storing the maximum MSGID on startup and issuing a single delete command for any MSGID that is lower than the maximum MSGID. For example, if a maximum MSGID on startup is MSGID10 and the batch_size is 5, and the prune thread receives a notification for a lower MSGID, i.e. MSGID4, the prune thread issues a single delete command for MSGID4.

It should also be appreciated that it is possible for the browser thread to not find any MSGIDs in the DONEMSG table on startup and a null may be sent as part of the START_PRUNING notification to the prune thread. Here, the prune thread waits for a MSGID with sequence number 1 before issuing any range-based deleted command.

It should further be noted that a user can reinitialize the database replication process, thereby reloading the target database table. In this scenario, the MSGID sequence number is also reset to 1. However, the MSGID will have a sequence time, or timestamp, that is higher than the previous MSGID sequence. The prune thread automatically handles a reset in the sequence number as follows. When a MSGID has a new sequence time, the ordered list data structure is inspected by the prune thread for a contiguous range of MSGIDs with an older sequence time. If there is a single MSGID, then a single delete command is executed on the DONEMSG table to thereby delete this message. If there is a contiguous range of MSGIDs in the ordered list data structure, then a range-based delete command is issued without satisfying the batch size. On successful execution of single delete command or the range-based delete command, any outstanding changes on the receive queue are committed and any database changes are committed. The just deleted single MSGID or a range of MSGIDs is removed from the in-memory ordered list data structure. The maximum MSGID is updated so that any new MSGIDs that are lower and still using the old sequence time would still be deleted by issuing a single delete command on the DONEMSG table. If the single delete command or range-based deleted command does not execute successfully, then the operation stops with an error.

Thus, the illustrative embodiments provide mechanisms for pruning messages in a DONEMSG table of a replication database system asynchronously using range-based delete commands that delete a contiguous range of messages using a single range-based delete command. The illustrative embodiments further provide mechanisms for immediately deleting messages from a receive queue of the replication database system so as to minimize the size of the receive queue. The pruning mechanisms of the illustrative embodiments provide efficient pruning of messages in the queues without introducing additional overhead in the replication database system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage device having a computer readable program stored therein, wherein the computer readable program, when executed on a computing device, causes the computing device to:
    receive, in a receive queue data structure, associated with a browser thread, a transaction message from a source database node;
    apply, by an agent thread, a change to data of a target database node based on a specification of the change in the transaction message in the receive queue data structure;
    store an identifier of the transaction message in a done message data structure associated with the target database node;
    store, by the browser thread, an identifier of the transaction message in a prune queue data structure associated with the target database node, in response to the transaction message being placed in the done message data structure;
    delete, by a prune thread executing on the target database node, a batch of one or more completed transaction messages from the receive queue regardless of an order or sequence of the completed transaction messages in the receive queue;
    determine, by the prune thread, whether a contiguous range of identifiers of transaction messages equal to or greater than a predetermined batch size is present in the prune queue data structure at least by comparing a counter value to the predetermined batch size, wherein the counter value is incremented with each transaction message deleted from the receive queue data structure by the prune thread, and wherein if the counter value is greater than or equal to the predetermined batch size, then it is determined that a contiguous range of identifiers of transaction messages equal to or greater than the predetermined batch size is present in the prune queue data structure; and
    delete a range of transaction messages from the done message data structure in response to a contiguous range of identifiers of transaction messages equal to or greater than the predetermined batch size being present in the prune queue data structure.

2. The computer program product of claim 1, wherein the browser thread, on start-up, communicates with the prune thread to register the receive queue data structure for pruning by the prune thread and, upon shut-down, communicates with the prune thread to de-register the receive queue data structure for pruning by the prune thread.

3. The computer program product of claim 1, wherein storing an identifier of the transaction message in a prune queue data structure associated with the target database node comprises:
    sending, by the agent thread, an identifier of the transaction message in the done queue data structure to the browser thread; and
    sending, by the browser thread, the identifier of the transaction message in a prune queue data structure to the prune thread.

4. The computer program product of claim 3, wherein the computer readable program further causes the computing device to:
    immediately delete, by the prune thread, the transaction message from the receive queue data structure, in response to receiving the identifier of the transaction message from the prune queue data structure, such that transaction messages are deleted from the receive queue data structure being deleted in the order in which they were committed on the data of the target database node.

5. The computer program product of claim 4, wherein the order in which transaction messages are deleted from the receive queue data structure is different than an order in which the transaction messages were received in the receive queue data structure from the source database node.

6. The computer program product of claim 1, wherein the computer readable program further causes the computing device to:
    determine whether a condition exists indicating that the determination as to whether a contiguous range of identifiers of transaction messages equal to or greater than a predetermined batch size is present in the prune queue data structure is to be performed, wherein the determination regarding the contiguous range is performed in response to a determination that the condition exists.

7. The computer program product of claim 6, wherein the condition is determined to exist in response to one of a number of identifiers of transaction messages being stored in the done message data structure being a multiple of the batch size or an expiration of a timer.

8. The computer program product of claim 1, wherein determining if a contiguous range of identifiers of transaction messages equal to or greater than a predetermined batch size is present in the prune queue data structure comprises:
    analyzing an in-memory ordered list data structure, associated with the receive queue, that stores a message identifier for each transaction message received in the receive queue data structure and applied by an agent thread of the target database system; and
    determining if a contiguous range of message identifiers equal to or greater than the predetermined batch size is present in the in-memory ordered list data structure.

9. An apparatus, comprising:
    a processor; and
    a memory coupled to the processor, wherein the memory comprises instructions which, when executed by the processor, cause the processor to:
    receive, in a receive queue data structure, associated with a browser thread, a transaction message from a source database node;
    apply, by an agent thread, a change to data of a target database node based on a specification of the change in the transaction message in the receive queue data structure;
    store an identifier of the transaction message in a done message data structure associated with the target database node;
    store, by the browser thread, an identifier of the transaction message in a prune queue data structure associated with the target database node, in response to the transaction message being placed in the done message data structure;
    delete, by a prune thread executing on the target database node, a batch of one or more completed transaction messages from the receive queue regardless of an order or sequence of the completed transaction messages in the receive queue;

determine, by the prune thread, whether a contiguous range of identifiers of transaction messages equal to or greater than a predetermined batch size is present in the prune queue data structure at least by comparing a counter value to the predetermined batch size, wherein the counter value is incremented with each transaction message deleted from the receive queue data structure by the prune thread, and wherein if the counter value is greater than or equal to the predetermined batch size, then it is determined that a contiguous range of identifiers of transaction messages equal to or greater than the predetermined batch size is present in the prune queue data structure; and delete a range of transaction messages from the done message data structure in response to a contiguous range of identifiers of transaction messages equal to or greater than the predetermined batch size being present in the prune queue data structure.

10. The apparatus of claim 9, wherein the browser thread, on start-up, communicates with the prune thread to register the receive queue data structure for pruning by the prune thread and, upon shut-down, communicates with the prune thread to de-register the receive queue data structure for pruning by the prune thread.

11. The apparatus of claim 9, wherein the instructions that cause the processor to store an identifier of the transaction message in a prune queue data structure associated with the target database node further comprise instructions that cause the processor to:

send, by the agent thread, an identifier of the transaction message in the done queue data structure to the browser thread;

send, by the browser thread, the identifier of the transaction message in a prune queue data structure to the prune thread; and immediately delete, by the prune thread, the transaction message from the receive queue data structure, in response to receiving the identifier of the transaction message from the prune queue data structure, such that transaction messages are deleted from the receive queue data structure being deleted in the order in which they were committed on the data of the target database node.

12. The apparatus of claim 11, wherein the order in which transaction messages are deleted from the receive queue data structure is different than an order in which the transaction messages were received in the receive queue data structure from the source database node.

13. The apparatus of claim 9, wherein the instructions further cause the processor to:

determine whether a condition exists indicating that the determination as to whether a contiguous range of identifiers of transaction messages equal to or greater than a predetermined batch size is present in the prune queue data structure is to be performed, wherein the determination regarding the contiguous range is performed in response to a determination that the condition exists, and wherein the condition is determined to exist in response to one of a number of identifiers of transaction messages being stored in the done message data structure being a multiple of the batch size or an expiration of a timer.

14. The apparatus of claim 9, wherein the instructions that cause the processor to determine if a contiguous range of identifiers of transaction messages equal to or greater than a predetermined batch size is present in the prune queue data structure further comprise instructions that cause the processor to:

analyze an in-memory ordered list data structure, associated with the receive queue, that stores a message identifier for each transaction message received in the receive queue data structure and applied by an agent thread of the target database system; and determine if a contiguous range of message identifiers equal to or greater than the predetermined batch size is present in the in-memory ordered list data structure.

* * * * *